(12) United States Patent
Kim et al.

(10) Patent No.: US 10,600,191 B2
(45) Date of Patent: Mar. 24, 2020

(54) SYSTEM AND METHOD FOR TRACKING MULTIPLE OBJECTS

(71) Applicant: Electronics and Telecommunications Research Institute, Daejeon (KR)

(72) Inventors: Kwang Yong Kim, Sejong-si (KR); Kee Seong Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 189 days.

(21) Appl. No.: 15/662,738

(22) Filed: Jul. 28, 2017

(65) Prior Publication Data

US 2018/0232891 A1  Aug. 16, 2018

(30) Foreign Application Priority Data

Feb. 13, 2017  (KR) ........................ 10-2017-0019427

(51) Int. Cl.
*G06T 7/254*  (2017.01)
*G06T 7/246*  (2017.01)
(Continued)

(52) U.S. Cl.
CPC .......... *G06T 7/254* (2017.01); *G06K 9/00369* (2013.01); *G06K 9/00771* (2013.01);
(Continued)

(58) Field of Classification Search
CPC .......... G06K 9/00369; G06K 9/00771; G06K 9/3241; G06T 7/248; G06T 7/254;
(Continued)

(56) References Cited

U.S. PATENT DOCUMENTS 9,361,520 B2 * 6/2016 Collins .............. G06K 9/00711
10,515,471 B2 * 12/2019 Um .................... G06K 9/00369
(Continued)

FOREIGN PATENT DOCUMENTS

| KR | 10-2015-0081732 A | 7/2015 | |
| KR | 10-2015-0084740 A | 7/2015 | |
| WO | WO-2013015601 A1 * | 1/2013 | .......... G06K 9/3241 |

OTHER PUBLICATIONS

Andriyenko, Anton, et al. "Descrete-Continuous Optimization for Multi-Target Tracking." Proceedings of the IEEE Conference on Computer Vision and Pattern Recongnition (CVPR), Providence, RI, Jun. 2012. (8 pages in English).

*Primary Examiner* — Mekonen T Bekele
(74) *Attorney, Agent, or Firm* — NSIP Law

(57) ABSTRACT

The present invention relates to a system for tracking an object. The system includes an image capturing unit configured to capture a video of a predetermined observation area and output the captured video; and a multi-object tracker configured to output an object-tracking image by tracking multiple objects within an object image which is generated by extracting the objects from each of image frames obtained from the video obtained from the image capturing unit, wherein the multi-object tracker determines whether occlusion of the objects or hijacking occurs while performing multi-object tracking, and when it is determined that at least one of the occlusion and hijacking occurs, the multi-object tracker outputs the object-tracking image corrected by removing the occurring occlusion or hijacking.

18 Claims, 16 Drawing Sheets

(51) Int. Cl.
*G06K 9/00* (2006.01)
*G06K 9/32* (2006.01)

(52) U.S. Cl.
CPC ............ *G06K 9/3241* (2013.01); *G06T 7/248* (2017.01); *G06T 2207/10024* (2013.01); *G06T 2207/30196* (2013.01); *G06T 2207/30221* (2013.01); *G06T 2207/30232* (2013.01)

(58) Field of Classification Search
CPC .......... G06T 2207/10024; G06T 2207/30196; G06T 2207/30221; G06T 2207/30232
See application file for complete search history.

(56) References Cited

U.S. PATENT DOCUMENTS

| | | | |
|---|---|---|---|
| 2003/0103648 A1* | 6/2003 | Ito | G08B 13/19602 382/103 |
| 2005/0018879 A1* | 1/2005 | Ito | G08B 13/19602 382/103 |
| 2006/0170769 A1* | 8/2006 | Zhou | G06K 9/00362 348/143 |
| 2007/0047834 A1* | 3/2007 | Connell | G06T 5/50 382/274 |
| 2008/0231709 A1* | 9/2008 | Brown | G06K 9/00771 348/169 |
| 2009/0296989 A1* | 12/2009 | Ramesh | G06K 9/00771 382/103 |
| 2011/0221890 A1 | 9/2011 | Yamashita | |
| 2012/0051594 A1 | 3/2012 | Kim et al. | |
| 2014/0348380 A1 | 11/2014 | Yoon et al. | |
| 2015/0172604 A1* | 6/2015 | Kim | H04N 7/181 348/159 |
| 2017/0148174 A1* | 5/2017 | Kim | G01C 3/08 |
| 2017/0201723 A1* | 7/2017 | Kim | G06F 3/04842 |
| 2018/0012078 A1* | 1/2018 | Pournaghi | G06K 9/00718 |
| 2018/0137892 A1* | 5/2018 | Ding | G06K 9/00744 |
| 2018/0225852 A1* | 8/2018 | Um | G06T 11/60 |

* cited by examiner

INPUT VIDEO

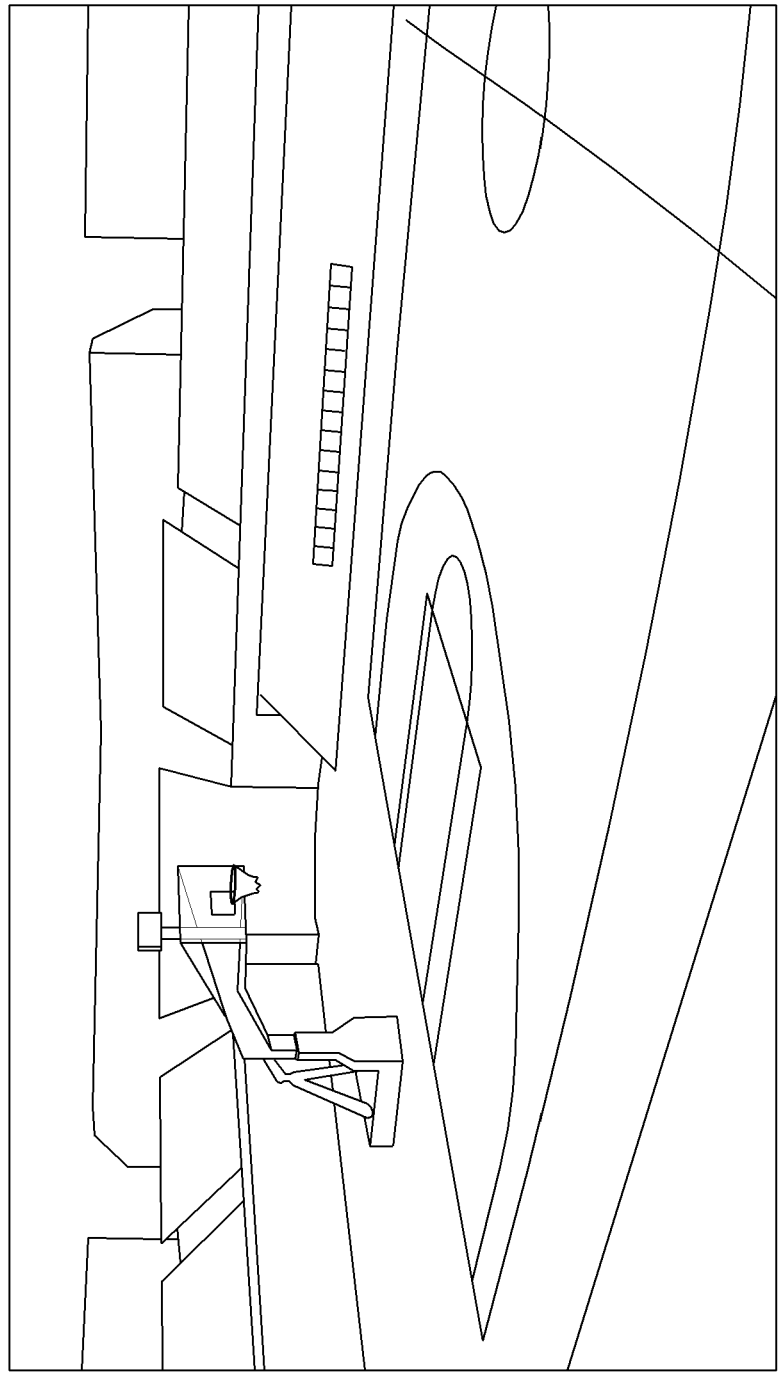

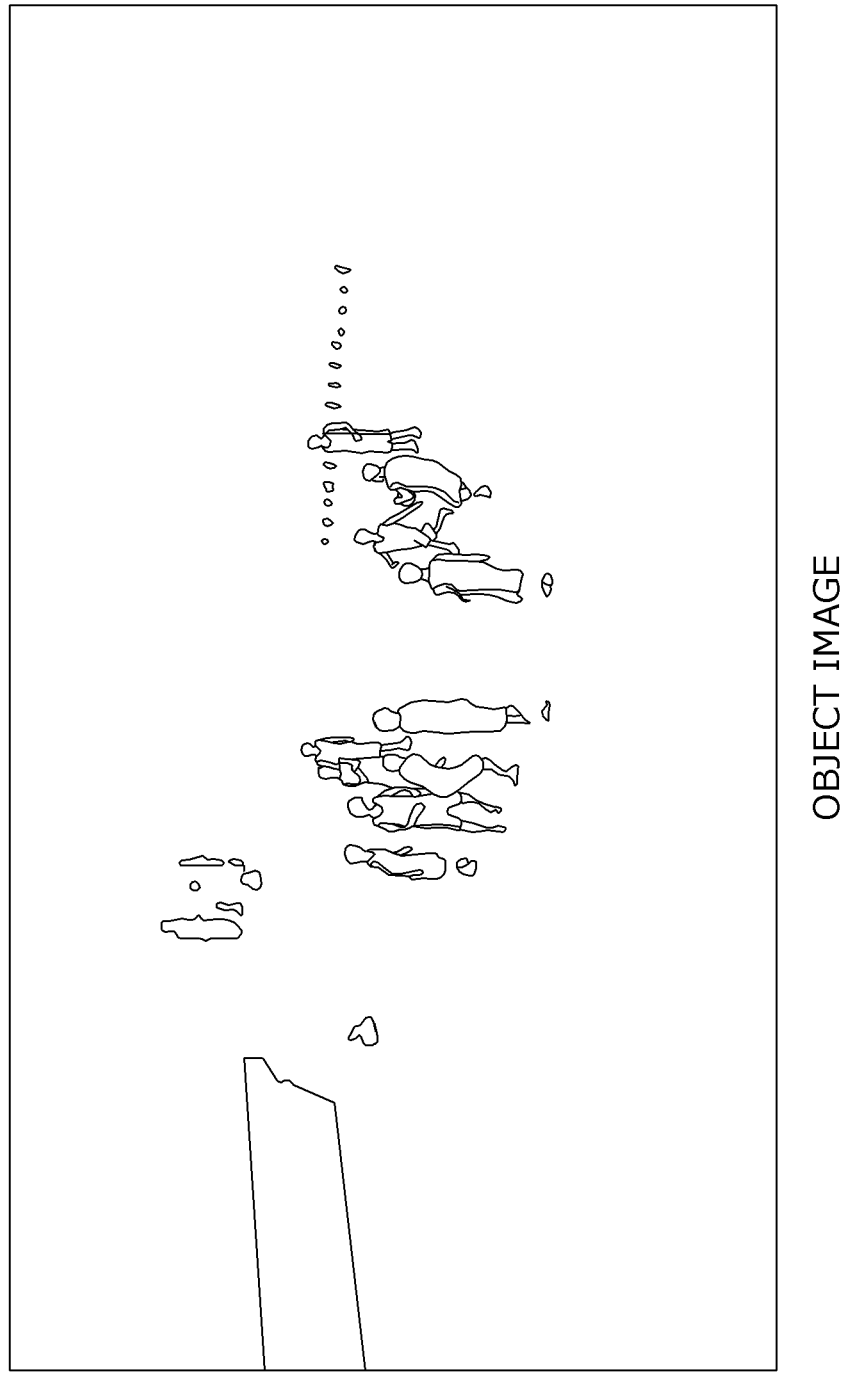

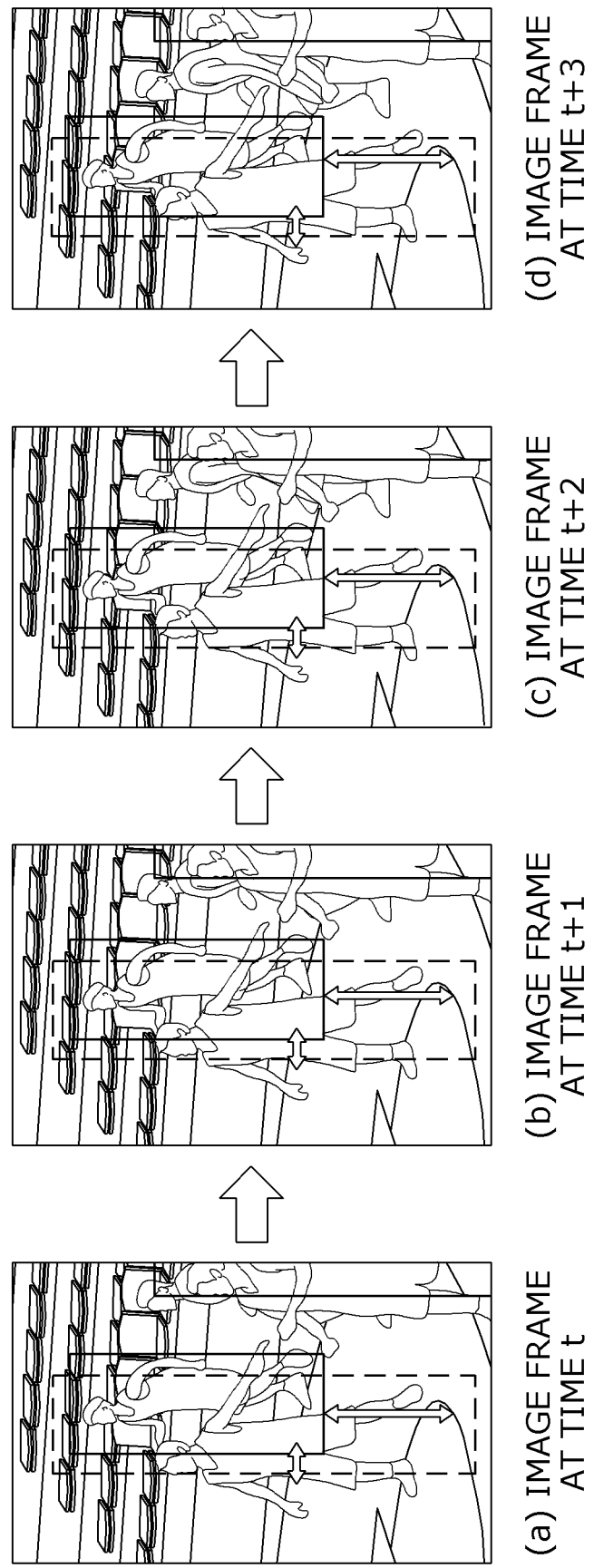

ORIGINAL VIDEO

WHERE HIJACKING OCCURS

WHERE HIJACKING IS REMOVED

WHERE OCCLUSION OF OBJECTS OCCURS

WHERE OCCLUSION OF
OBJECTS IS REMOVED

FIG. 8

|  | Exp1 | Exp2 | Exp3 | Exp4 | Exp5 |
|---|---|---|---|---|---|
| PRESENT INVENTION | 23.0163 | 18.8581 | 17.1076 | 19.5226 | 10.507 |
| CONVENTIONAL ART(MEEM) | 48.8317 | 44.4263 | 50.0872 | 75.4342 | 49.8825 |
| PERFORMANCE IMPROVEMENT | 212% | 235% | 292% | 386% | 474% |
|  | Exp6 | Exp7 | Exp8 | Exp9 | Exp10 |
| PRESENT INVENTION | 16.3084 | 18.3336 | 10.1233 | 30.8072 | 14.2514 |
| CONVENTIONAL ART(MEEM) | 365.26 | 170.853 | 35.0475 | 74.7101 | 95.0037 |
| PERFORMANCE IMPROVEMENT | 2239% | 931% | 346% | 242% | 666% |

FIG. 9

|  | Exp1 | Exp2 | Exp3 | Exp4 | Exp5 |
|---|---|---|---|---|---|
| PRESENT INVENTION | 0.76266 | 0.76666 | 0.77333 | 0.78888 | 0.8 |
| CONVENTIONAL ART(MEEM) | 0.62666 | 0.63333 | 0.6 | 0.58888 | 0.61333 |
| PERFORMANCE IMPROVEMENT | 121% | 121% | 128% | 133% | 130% |
|  | Exp6 | Exp7 | Exp8 | Exp9 | Exp10 |
| PRESENT INVENTION | 0.78996 | 0.77778 | 0.83333 | 0.73333 | 0.85714 |
| CONVENTIONAL ART(MEEM) | 0.21848 | 0.64444 | 0.6 | 0.57142 | 0.43809 |
| PERFORMANCE IMPROVEMENT | 361% | 120% | 138% | 128% | 195% |

FIG. 10

|  | Exp1 | Exp2 | Exp3 | Exp4 | Exp5 |
|---|---|---|---|---|---|
| PRESENT INVENTION | 3.12 | 4.31 | 3.75 | 4.12 | 3.25 |
| CONVENTIONAL ART(MEEM) | 0.23 | 0.27 | 0.21 | 0.30 | 0.29 |

|  | Exp6 | Exp7 | Exp8 | Exp9 | Exp10 |
|---|---|---|---|---|---|
| PRESENT INVENTION | 3.98 | 3.54 | 3.43 | 3.17 | 3.99 |
| CONVENTIONAL ART(MEEM) | 0.28 | 0.21 | 0.19 | 0.25 | 0.20 |

SYSTEM AND METHOD FOR TRACKING MULTIPLE OBJECTS

CROSS-REFERENCE TO RELATED APPLICATION

This application claims priority to and the benefit of Korean Patent Application No. 10-2017-0019427, filed on Feb. 13, 2017, the disclosure of which is incorporated herein by reference in its entirety.

BACKGROUND

1. Field of the Invention

The present invention relates to an object tracking system, and more particularly, to a system and method for tracking multiple objects.

2. Discussion of Related Art

In the sports and security service fields, a service capable of accurately tracking multiple target objects (e.g., people) and providing information about the objects by analyzing images obtained through camera tracking on the target objects is provided.

In the case where multiple target objects are tracked to provide the information about the objects, there may be problems of occlusion among objects and hijacking which causes a target object to be changed (i.e., causes another object to be tracked) due to the similarities between the objects.

Therefore, there is a need for an approach that prevents an object tracking error due to occlusion of objects and hijacking that tracks another target object.

SUMMARY OF THE INVENTION

Therefore, the present invention is devised to solve the aforementioned problems, and the objective of the present invention is to provide a system and method for tracking multiple objects, which is capable of providing accurate information about a tracked object by handling occlusion of objects and hijacking which may occur when multiple objects are tracked simultaneously.

In one general aspect, there is provided a system for tracking multiple objects including: an image capturing unit configured to capture a video of a predetermined observation area and output the captured video; and a multi-object tracker configured to output an object-tracking image by tracking multiple objects within an object image which is generated by extracting the objects from each of image frames obtained from the video obtained from the image capturing unit, wherein the multi-object tracker determines whether occlusion of the objects or hijacking occurs while performing multi-object tracking, and when it is determined that at least one of the occlusion and the hijacking occurs, the multi-object tracker outputs the object-tracking image corrected by removing the occurring occlusion or hijacking.

The multi-object tracker may output a current object-tracking image when it is determined that the occlusion of the objects and the hijacking do not occur.

When a bounding box of a target object is detected to be occluded by a bounding box of another object, the multi-object tracker may determine that the occlusion of the objects occurs.

When it is determined that the occlusion of the objects occurs, the multi-object tracker may estimate a bounding box and depth of each of the objects and remove objects except for a target object from the object image.

The multi-object tracker may determine a depth order of the objects on the basis of the estimated bounding boxes and depths of the objects, recognize at least one of objects in front of and behind the target object on the basis of the determined depth order of the objects, and remove the recognized object.

When a displacement of a bounding box of a target object is detected to be identical to a displacement of a bounding box of another object for a predetermined time period, the multi-object tracker may determine that the hijacking occurs.

When it is determined that the hijacking occurs, the multi-object tracker may remove an object being actually tracked by a bounding box of a target object from the object image so that the bounding box tracks the target object.

The multi-object tracker may generate a reference background image by modeling a reference background using a reference background modeling video obtained from the image capturing unit and generate the object image by extracting the objects from each of the image frames on the basis of comparison between the reference background image and each of the image frames obtained from a video for object tracking obtained from the image capturing unit.

The multi-object tracker may obtain a color difference by comparing colors of the reference background image and each of the image frames, and extract the objects from each of the image frames on the basis of the obtained color difference.

When the generated object image is an initial object image, the multi-object tracker may allocate a bounding box to each of the objects to initialize multi-object tracking and perform the multi-object tracking.

In another general aspect, there is provided a method of tracking multiple objects including: generating a reference background image by modeling a reference background using a reference background modeling video obtained from an image capturing unit; generating an object image by extracting objects from each of image frames on the basis of comparison between the reference background image and each of the image frames obtained from a video for object tracking obtained from the image capturing unit; and outputting a current object-tracking image or a corrected object-tracking image according to a result of determination on whether occlusion of the objects or hijacking occurs, while performing multi-object tracking on the basis of the object image.

Whether the occlusion of the objects occurs may be determined on the basis of detection of whether a bounding box of a target object is occluded by a bounding box of another object.

Whether the hijacking occurs may be determined on the basis of detection of whether a displacement of a bounding box of a target object is identical to a displacement of a bounding box of another object.

The outputting of the current object-tracking image may be performed when it is determined that the occlusion of the objects and the hijacking do not occur.

When it is determined that the occlusion of the objects occurs, the outputting of the corrected object-tracking image may be performed wherein the object-tracking image may be corrected by removing objects except for a target object from the object image by estimating a bounding box and depth of each of the objects.

When it is determined that the hijacking occurs, the outputting of the corrected object-tracking image may be performed wherein the object-tracking image may be corrected by removing an object being actually tracked by a bounding box of a target object from the object image so that the bounding box tracks the target object.

When it is determined that the occlusion of the objects and the hijacking occur, the outputting of the corrected object-tracking image may be performed wherein the object-tracking image may be corrected by removing objects except for a target object from the object image by estimating a bounding box and depth of each of the objects and is corrected also by removing an object being actually tracked by a bounding box of the target object from the object image so that the bounding box tracks the target object.

The removing of the object other than the target object from the object image by estimating the bounding box and depth of each of the objects may include determining a depth order of the objects on the basis of the estimated bounding boxes and depths of the objects, recognizing at least one of objects in front of and behind the target object on the basis of the determined depth order, and removing the recognized object.

The generating of the object image may include obtaining a color difference by comparing colors of the reference background image and each of the image frames and extracting the objects from each of the image frames on the basis of the obtained color difference.

When initial multi-object tracking is performed, the performing of the multi-object tracking on the basis of the object image may include allocating a bounding box to each of the objects to initialize the multi-object tracking and then performing the multi-object tracking.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 4B is a picture showing an example of a reference background image modeled by the multi-object tracker in the embodiment of the present invention;

FIG. 4C is a picture showing an example of an object image extracted from the input video by the multi-object tracker in the embodiment of the present invention;

FIG. 5 is a picture for describing a method of determining whether hijacking occurs according to an embodiment of the present invention;

FIG. 8 is a table for comparing center location errors of the system for tracking multiple objects according to the embodiment of the present invention and a conventional object tracking system;

FIG. 9 is a table for comparing success rates of the system for tracking multiple objects according to the embodiment of the present invention and the conventional object tracking system; and FIG. 10 is a table for comparing multi-object tracking times of the system for tracking multiple objects according to the embodiment of the present invention and the conventional object tracking system.

DETAILED DESCRIPTION OF EXEMPLARY EMBODIMENTS

Figure 1:
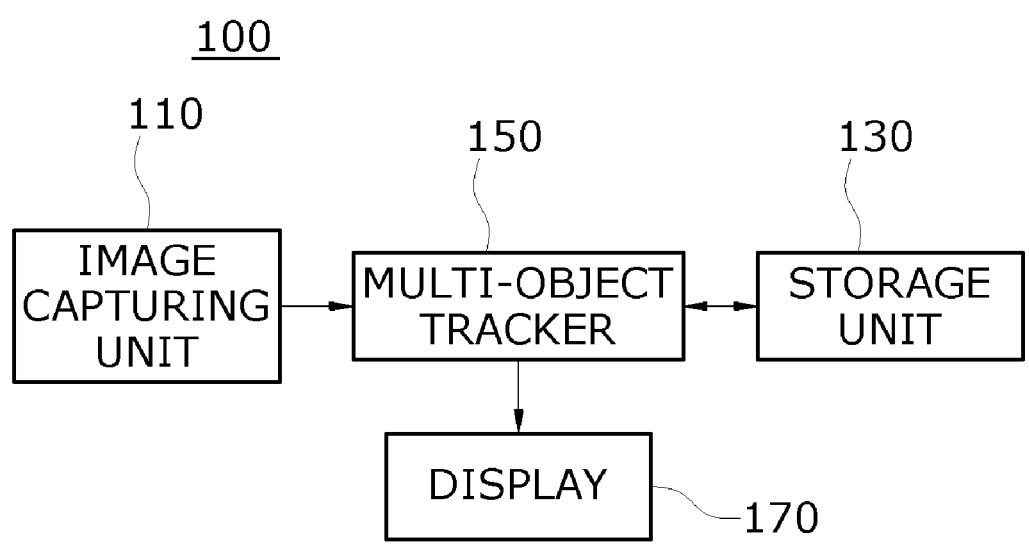
FIG. 1 is a diagram illustrating a configuration of a system for tracking multiple objects according to an exemplary embodiment of the present invention.

The particular structural or functional descriptions of embodiments according to the concepts of the present invention disclosed in the specification or the application are only intended for the purpose of describing embodiments according to the concepts of the present invention and the embodiments according to the concepts of the present invention may be practiced in various forms and should not be construed as being limited to those described in the specification or the application.

While the present invention is susceptible to various modifications and alternative forms, specific embodiments thereof are shown by way of example in the drawings and will herein be described in detail. It should be understood, however, that there is no intent to limit the present invention to the particular forms disclosed, but on the contrary, the present invention is to cover all modifications, equivalents, and alternatives falling within the spirit and scope of the present invention as defined by the claims.

Although the terms first, second, etc. may be used herein to describe various components, these components should not be limited by these terms. The terms may be only used for the purpose of distinguishing one component from another component, e.g., a first component may be named as a second component without departing from the scope of the present invention according to the concepts of the present invention and similarly, a second component may also be named as a first component.

When any component is referred to as being "connected" to another component, it should be understood that the former can be "directly connected" to the latter, or intervening components may be present. In contrast, when a component is referred to as being "directly connected" to another component, it should be understood that there are no intervening components. Other expressions describing the relationship between components, such as "between" and "directly between" or "adjacent to" and "adjacent directly to" should be also construed in the same way.

The terms used herein are only used to describe specific embodiments and not intended to limit the present invention. In the following embodiments, the terms in singular form may include the plural form unless otherwise specified. It should be understood that the terms "includes" and/or "including," or "comprises" and/or "comprising" indicate the presence of characteristics, numbers, steps, operations, components, parts or combinations thereof represented in the present disclosure but do not exclude the presence or addition of one or more other characteristics, numbers, steps, operations, components, parts or combinations thereof.

Unless otherwise defined herein, all terms used herein including technical or scientific terms have the same meanings as those generally understood by a person skilled in the art. Terms defined in dictionaries generally used should be construed to have meanings matching with contextual meanings in the related art and are not construed as an ideal or excessively formal meaning unless otherwise defined herein.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Hereinafter, a system and method for tracking multiple objects according to the present invention will be described in detail with reference to the accompanying drawings.

FIG. 1 is a diagram illustrating a configuration of a system for tracking multiple objects according to an exemplary embodiment of the present invention.

Referring to FIG. 1, a system 100 for tracking multiple objects (hereinafter, will be referred to as a "system") according to the exemplary embodiment of the present invention handles occlusion of objects and hijacking, which occur when multiple objects are simultaneously tracked and provides accurate information about a target object.

To this end, the system 100 includes at least one processor which tracks multiple objects while handling occlusion of objects and hijacking, and at least one memory configured to store necessary information (e.g., a multi-object tracking algorithm, object-occlusion handling algorithm, a hijacking handling algorithm, etc.) for tracking the multiple objects while handling the occlusion of objects and the hijacking.

Specifically, the system 100 may include an image capturing unit 110, a storage unit 130, a multi-object tracker 150, and a display 170.

The image capturing unit 110 is installed to capture a video of a predetermined area of interest to be observed (e.g., inside of a stadium, a security surveillance area, etc.) and provides a captured video to the multi-object tracker 150.

In the present invention, the video obtained by the image capturing unit 110 is used for modeling a reference background or tracking multiple objects.

For description, a video used for modeling the reference background will be referred to as a "reference background modeling video" and an image used for tracking multiple objects will be referred to as a "video for object tracking.

The storage unit 130 may be configured with at least one memory and configured to store necessary information (e.g., a multi-object tracking algorithm, an object-occlusion handling algorithm, a hijacking handling algorithm, etc.) for the multi-object tracker 150 to track multiple objects.

The multi-object tracker 150 tracks target objects within the video provided from the image capturing unit 110 and provides an object-tracking video to the display 170.

In this case, the multi-object tracker 150 determines whether occlusion of objects or hijacking occurs. When it is determined that the occlusion of objects or the hijacking occurs, the multi-object tracker 150 corrects the object-tracking video by handling the occlusion of objects or the hijacking and provides the corrected object-tracking image to the display 170.

Detailed functions related to the multi-object tracker 150 will be described below.

The display 170 may display the information provided from the multi-object tracker 150, i.e., the image-tracking video, and may be configured to include a liquid crystal display (LCD) panel or an organic light-emitting diode (OLED) panel.

In detail, the multi-object tracker 150 generates a reference background image by modeling a reference background using the reference background modeling video obtained from the image capturing unit 110.

In this case, the multi-object tracker 150 models the reference background on the basis of a background image in the reference background modeling video.

In addition, the multi-object tracker 150 extracts objects from each image frame on the basis of comparison between the reference background image and each image frame obtained from the video for object tracking obtained from the image capturing unit 110.

In this case, the multi-object tracker 150 obtains a color difference by comparing colors of the reference background image and each image frame, extracts objects from each image frame on the basis of the obtained color difference and generates an object image.

Then, the multi-object tracker 150 performs multi-object tracking on the basis of the generated object image and provides the object-tracking image to the display 170.

In this case, when the generated object image is an initial object image (i.e., an initial attempt for object tracking), the multi-object tracker 150 initializes multi-object tracking by allocating a bounding box (a tracking area) to each of the objects and then performs multi-object tracking.

Also, in order to prevent a bounding box error from occurring in the process of tracking multiple objects, the multi-object tracker 150 performs the multi-object tracking while allowing the bounding box to track the target object using a difference image between an input image and the background image.

In this case, the multi-object tracker 150 performs the multi-object tracking while slightly moving the bounding box to around the target object so that the bounding box can fully contain the target object therein.

Meanwhile, the multi-object tracker 150 may perform the multi-object tracking on the basis of a kernalized correlation filter (KCF) which is extended to track multiple objects.

A KCF-based multi-object tracking method is a tracking method that repeatedly performs a conventional KCF-based tracking method which tracks a single object as many times as the number of target objects to be tracked.

An algorithm for tracking multiple objects on the basis of a KCF which is extended to track multiple objects may be expressed as follows:

```
for (i=1; i < the number of target objects to be tracked; i++)
{
    Single object KCF tracking
}
```

In addition, the multi-object tracker 150 determines whether occlusion of objects or hijacking occurs, while performing multi-object tracking. When it is determined that the occlusion of objects or the hijacking occurs, the multi-object tracker 150 generates a corrected object-tracking image by handling the occlusion of objects or hijacking and provides the corrected object-tracking image to the display 170.

In this case, when a bounding box of the target object is occluded by a bounding box of another object, the multi-object tracker 150 determines that occlusion between the objects occurs.

For example, when objects of similar colors occlude each other, tracking of a target object may fail due to an object with a similar appearance in front of and/or behind the target object.

When it is determined that the occlusion of objects occurs, the multi-object tracker 150 estimates a bounding box and depth of each of the objects within the object image and removes an object other than the target objects.

In this case, the multi-object tracker 150 determines a depth order of objects on the basis of the estimated bounding box and depth of each object, recognizes an object in front of and/or behind the target object on the basis of the determined depth order, and removes the recognized object.

Particularly, the multi-object tracker 150 determines the order of objects on the basis of an object positioned at a top position in the object image and determines that an object positioned upper than other objects is positioned farther away from the others.

In addition, the multi-object tracker 150 generates a corrected object-tracking image by removing objects except for the target object from the object image and provides the corrected object-tracking image to the display 170.

Meanwhile, when a displacement for a predetermined time period (e.g., 10 frames) set for the bounding box of the target object is detected to be identical to a displacement for a predetermined time period (e.g., 10 frames) set for a bounding box of another object, the multi-object tracker 150 determines that hijacking occurs.

In other words, when the displacement of the bounding box of the target object is detected to be identical to the displacement of the bounding box of another object for the predetermined time period, the multi-object tracker 150 determines that hijacking occurs.

For example, when a first bounding box intended for object A tracks object B, the first bounding box moves to the same displacement as a second bounding box that tracks object B, and thus based on this phenomenon, whether the hijacking has occurred may be determined.

When it is determined that the hijacking has occurred, the multi-object tracker 150 removes an object actually being tracked by the bounding box of the target object (that is, an object which is not a target object but is being tracked) from the object image so as to generate a corrected object-tracking image such that the bounding box tracks the target object. Then, the multi-object tracker 150 provides the corrected object-tracking image to the display 170.

Particularly, the multi-object tracker 150 removes objects being tracked by two bounding boxes, and may remove, for example, the common area of the two bounding boxes from the object image.

In the foregoing, the configuration and functions of the system for tracking multiple objects according to the exemplary embodiment of the present invention have been described. Hereinafter, a method of tracking multiple objects in the system for tracking multiple objects according to the exemplary embodiment of the present invention will be described.

Figure 2:
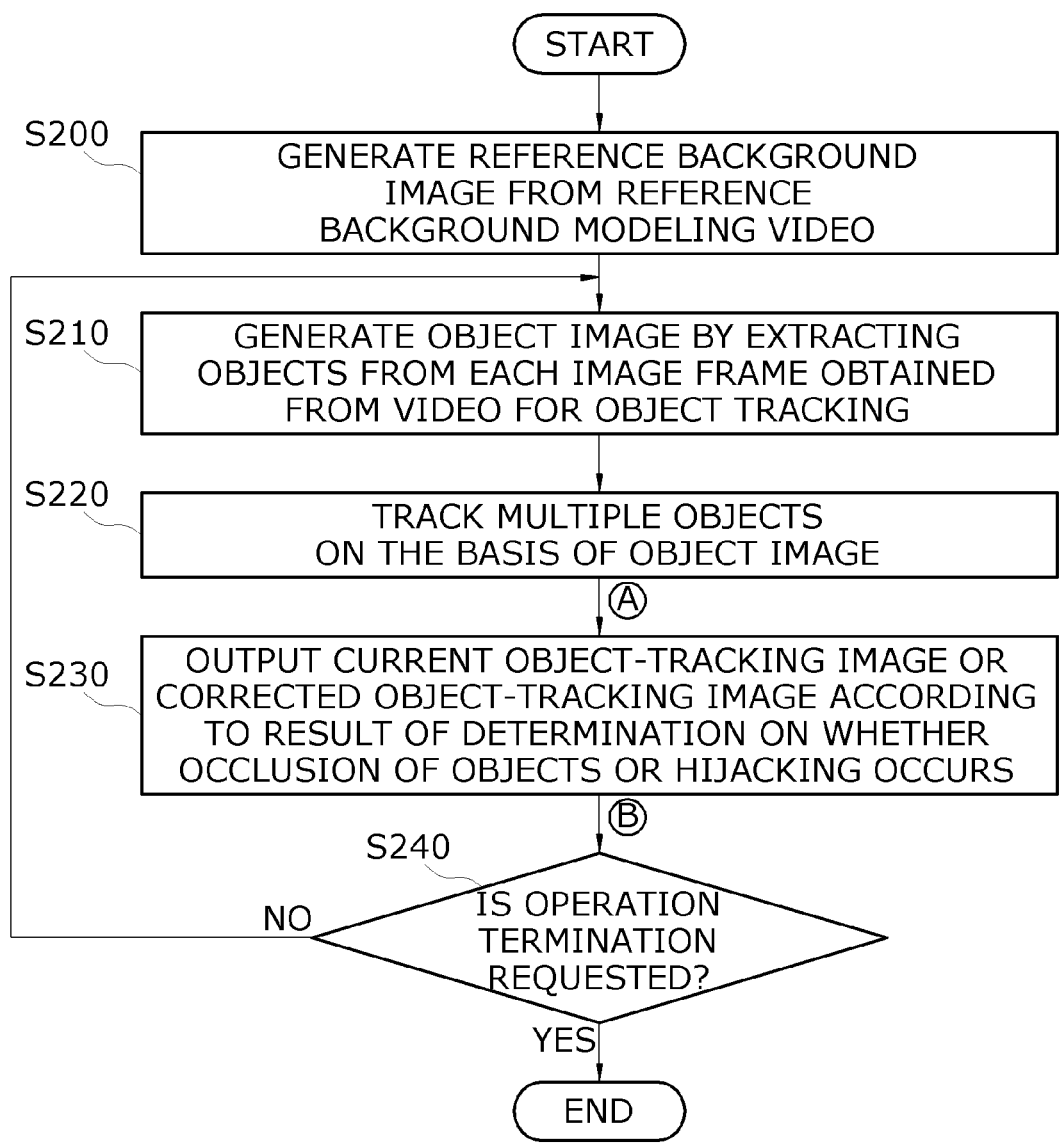
FIG. 2 is a flowchart illustrating operations of the system for tracking multiple objects according to the exemplary embodiment of the present invention.

FIG. 2 is a flowchart illustrating operations of the system for tracking multiple objects according to the exemplary embodiment of the present invention.

The operations shown in FIG. 2 may be performed by the system 100 which is described with reference to FIG. 1. The multi-object tracker 150 generates a reference background image by modeling a reference background using a reference background modeling video obtained from the image capturing unit 110 (S200).

In operation S200, the multi-object tracker 150 models a reference background on the basis of a background image within the reference background modeling video.

After operation S200, the multi-object tracker 150 generates an object image by extracting objects from each image frame on the basis of comparison between the reference background image and each image frame obtained from a video for object tracking obtained from the image capturing unit 110 (S210).

In operation S210, the multi-object tracker 150 obtains a color difference by comparing colors of the reference background image and each image frame, extracts objects from each image frame on the basis of the obtained color difference and generates an object image.

Figure 4A:
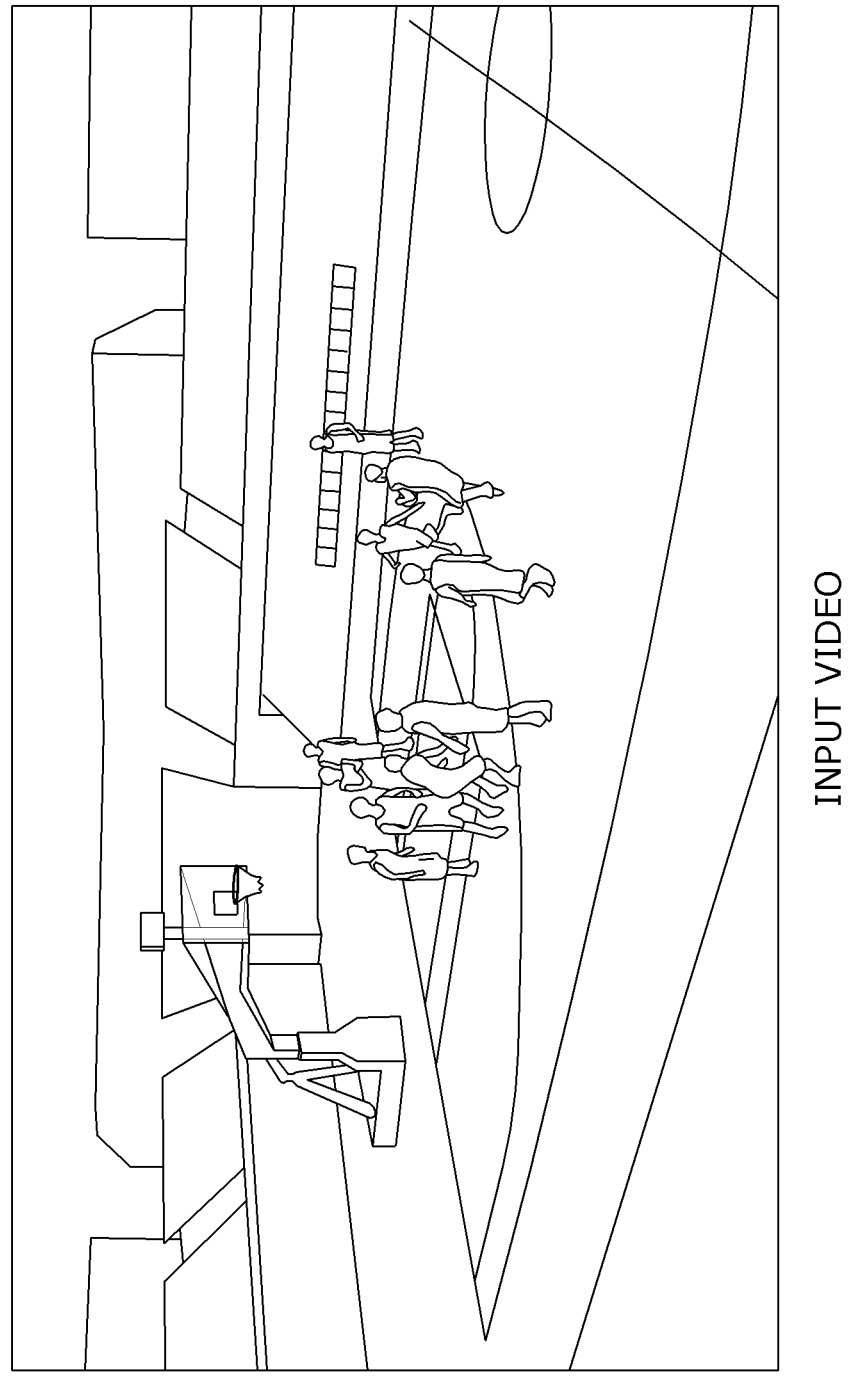
FIG. 4A is a picture showing an example of a video input to a multi-object tracker in one embodiment of the present invention.

FIG. 4A is a picture showing an example of a video input to a multi-object tracker in one embodiment of the present invention, FIG. 4B is a picture showing an example of a reference background image modeled by the multi-object tracker in the embodiment of the present invention, and FIG. 4C is a picture showing an example of an object image extracted from the input video by the multi-object tracker in the embodiment of the present invention.

After operation S210, the multi-object tracker 150 determines whether occlusion of objects or hijacking occurs, while performing multi-object tracking (S220). According to a result of determination on whether occlusion of objects or hijacking occurs, the multi-object tracker 150 outputs a current object-tracking image or a corrected object-tracking image through the display 170 (S230).

In this case, in operation S220, when an initial attempt for multi-object tracking is made, the multi-object tracking is initialized by allocating an object tracking area (a bounding box) to each of the objects and then the multi-object tracking is performed.

In addition, in operation S220, the multi-object tracking may be performed based on a KCF which is extended to track multiple objects.

Details of operation S230 will be described below with reference to FIG. 3.

After operation S230, the multi-object tracker 150 determines whether an operation termination is requested (S240). When the operation termination is not requested (S240—NO), operation S210 is performed, and when the operation termination is requested (S240—YES), the operation is ended.

Figure 3A:
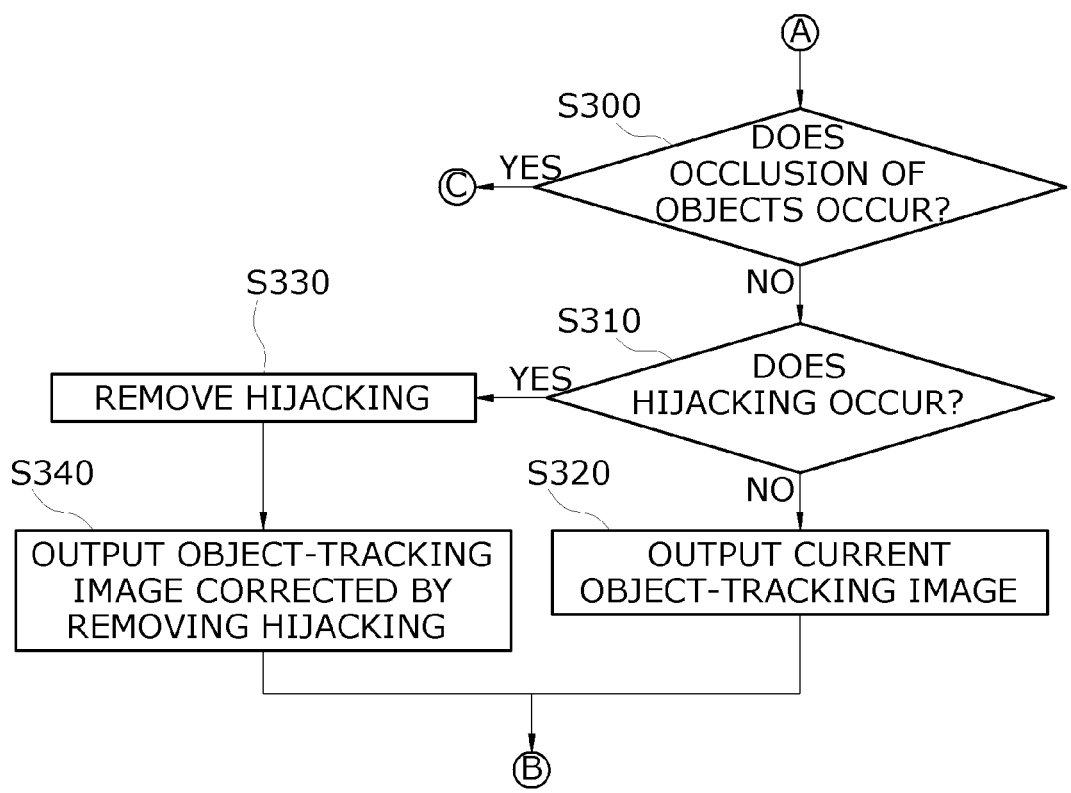
FIGS. 3A and 3B are flowcharts illustrating an operation of outputting an object-tracking image performed by the system for tracking multiple objects according to the exemplary embodiment of the present invention in detail.
Figure 3B:
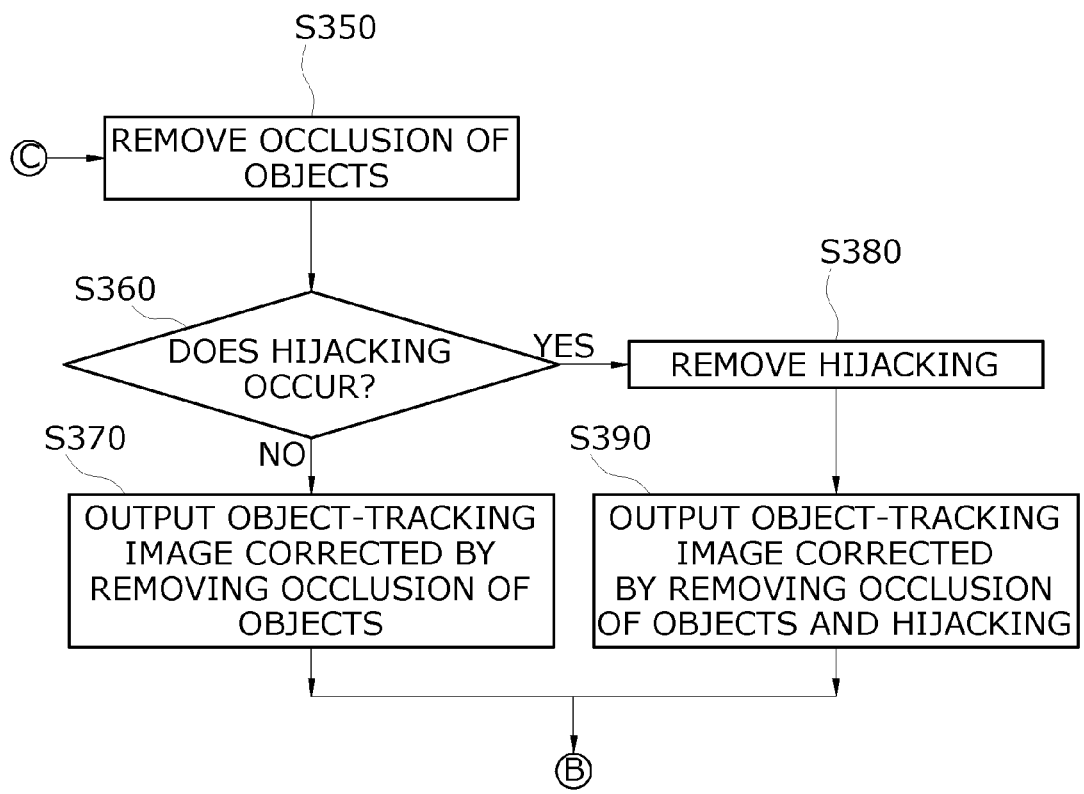

FIGS. 3A and 3B are flowcharts illustrating the operation of outputting an object-tracking image performed by the system for tracking multiple objects according to the exemplary embodiment of the present invention in detail.

The flowcharts shown in FIGS. 3A and 3B depict operation S230 of FIG. 2 in detail. The multi-object tracker 150 determines whether occlusion of objects occurs (S300).

In operation S300, the multi-object tracker 150 determines whether occlusion of objects occurs on the basis of a detection of whether the bounding box of each target object is occluded by a bounding box of another object.

In other words, in operation S300, when the bounding box of the target object is detected to be occluded by the bounding box of another object, the multi-object tracker 150 determines that the occlusion between the objects occurs.

When it is determined in operation S300 that the occlusion of objects does not occur (S300—NO), the multi-object tracker 150 determines whether hijacking occurs (S310).

In this case, in operation S310, when a displacement of the bounding box of the target object is detected to be identical to a displacement of the bounding box of another object for a predetermined time period (e.g., a predetermined number of frames), the multi-object tracker 150 determines that hijacking occurs.

FIG. 5 is a picture for describing a method of determining whether hijacking occurs according to an embodiment of the present invention.

Here, FIG. 5A is a picture showing an image frame at arbitrary time t, FIG. 5B is a picture showing an image frame at time (t+1), FIG. 5C is a picture showing an image frame at time (t+2), and FIG. 5D is a picture showing an image frame at time (t+3).

As shown in FIG. 5, when a displacement of a bounding box indicated by a dashed line is detected to be identical to a displacement of a bounding box indicated by a solid line for a predetermined number of frames, the multi-object tracker 150 determines that hijacking occurs.

When it is determined in operation S310 that hijacking does not occur (S310—NO), the multi-object tracker 150 outputs a current object-tracking image (S320).

When it is determined in operation S310 that hijacking occurs (S310—YES), the multi-object tracker 150 removes the hijacking (S330) and outputs an object-tracking image corrected through the removal of hijacking (S340).

In operation S330, the multi-object tracker 150 removes an object being actually tracked by the bounding box of the target object from the object image such that the bounding box tracks the target object, and thereby the hijacking is removed.

Figure 6A:
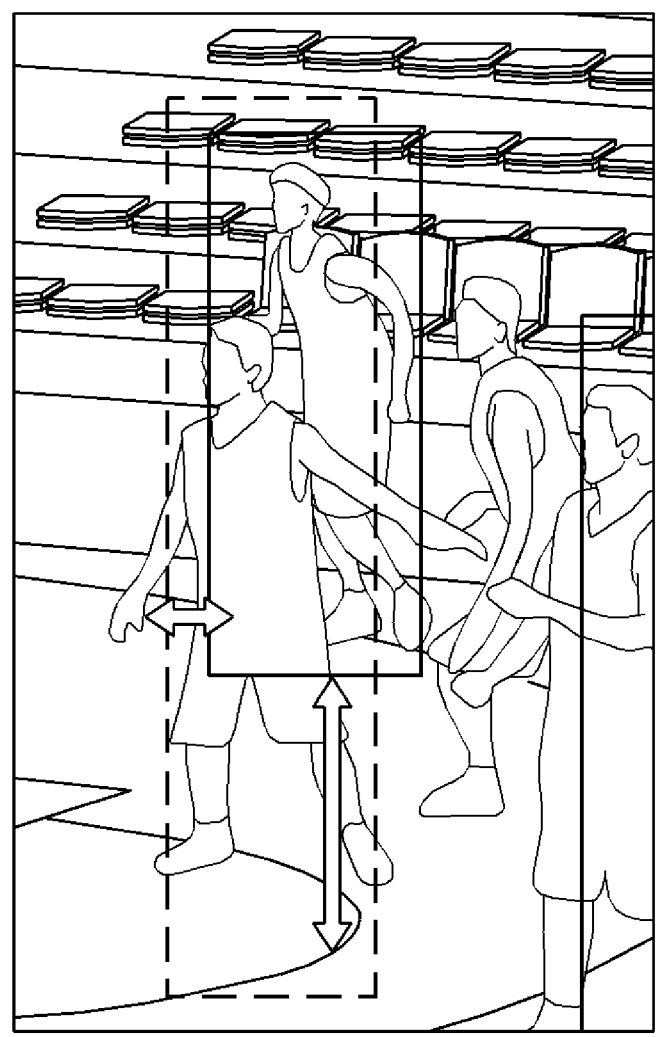
FIG. 6A is a picture showing an example of an original video input to the multi-object tracker in the embodiment of the present invention.
Figure 6B:
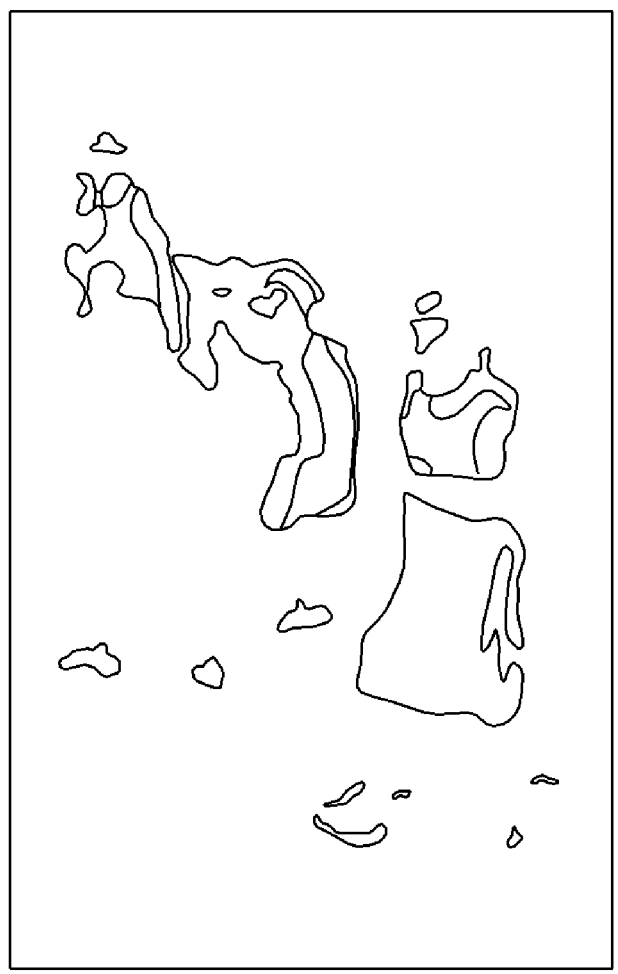
FIG. 6B is a picture showing an image in which hijacking occurs in the embodiment of the present invention.
Figure 6C:
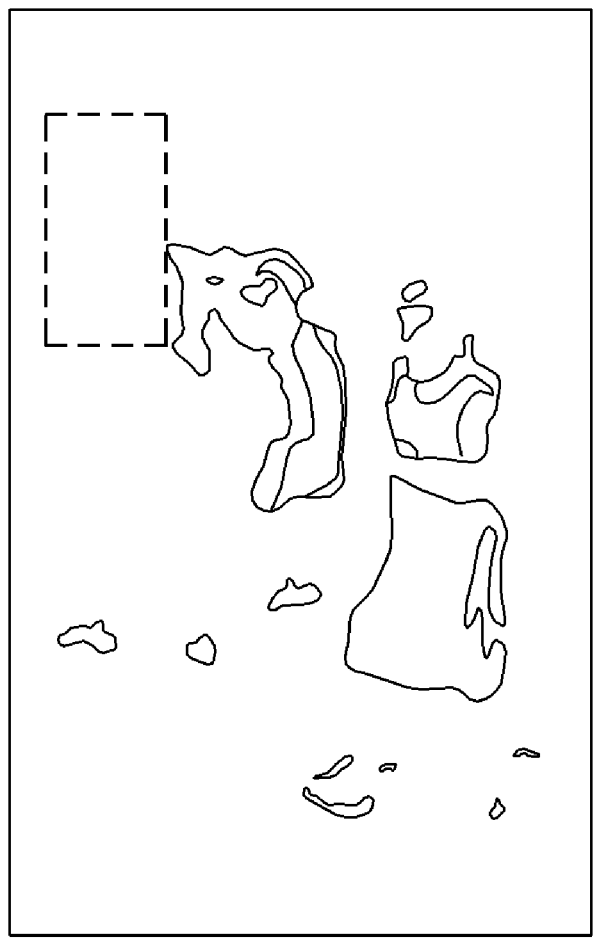
FIG. 6C is a picture showing an image from which the hijacking is removed in the embodiment of the present invention.

FIG. 6 is a picture showing an example of removal of hijacking in the embodiment of the present invention. FIG. 6A is a picture showing an example of an original video input to the multi-object tracker in the embodiment of the present invention, FIG. 6B is a picture showing an image in which hijacking occurs in the embodiment of the present invention, and FIG. 6C is a picture showing an image from which the hijacking is removed in the embodiment of the present invention.

FIG. 6 shows an example in which a bounding box indicated by a dashed line is tracking a non-target object (invalid object). When the multi-object tracker 150 removes the hijacking, the invalid object is removed from an object image, as shown in FIG. 6C.

When it is determined in operation S300 that occlusion of objects occurs (S300—YES), the multi-object tracker 150 removes the occlusion (S350) and determines whether hijacking occurs (S360).

In operation S350, the multi-object tracker 150 estimates a bounding box and depth of each object and removes the occlusion by removing objects except for the target object from the object image.

Specifically, the operation of removing the objects except for the target object from the object image by estimating the bounding box and depth of each object may be a process in which a depth order of objects is determined based on the bounding box and depth of each object, at least one of objects in front of and behind the target object is recognized on the basis of the determined depth order, and then the recognized object is removed.

Figure 7A:
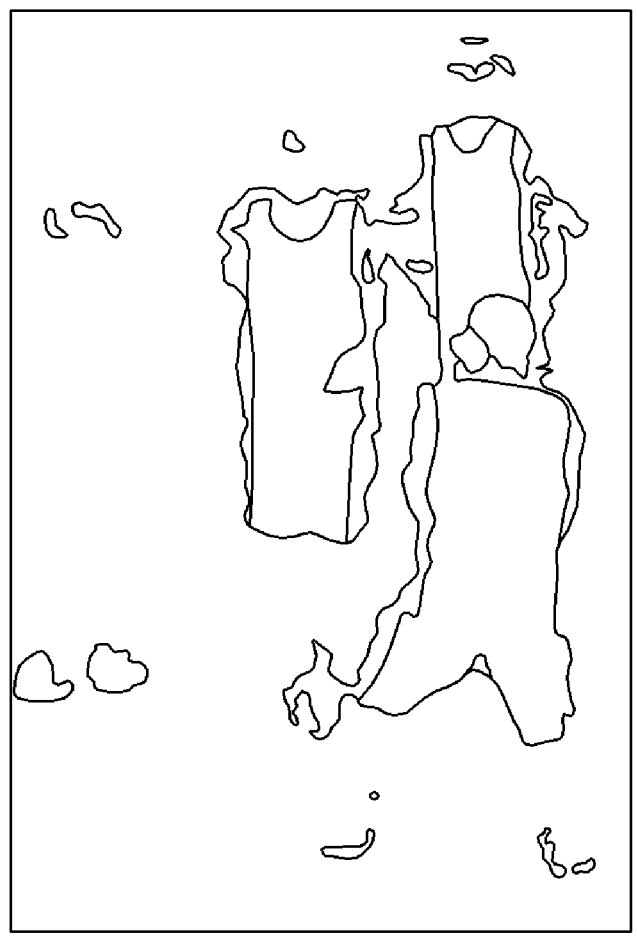
FIG. 7A shows an example in which occlusion of objects occurs in the embodiment of the present invention.
Figure 7B:
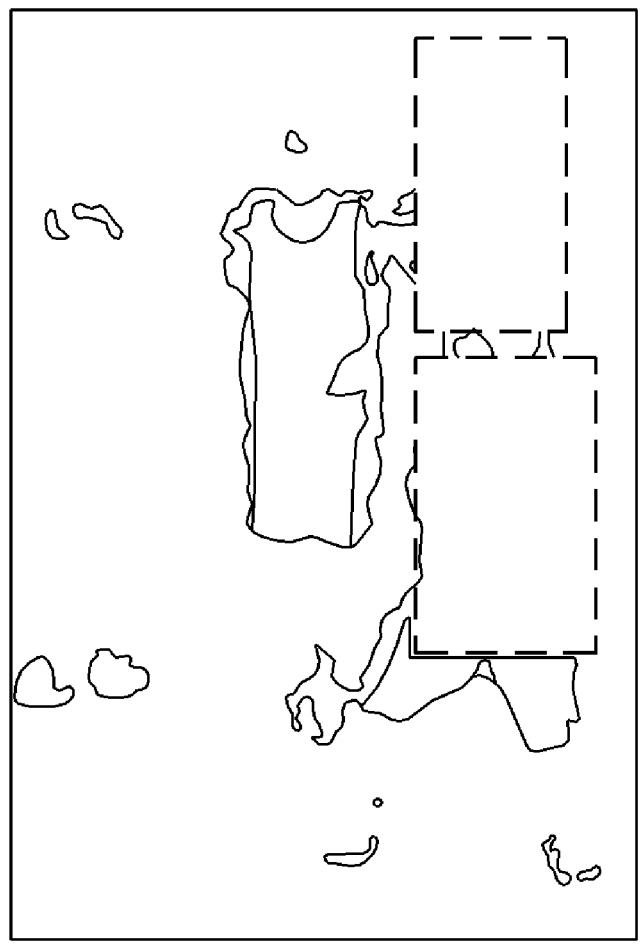
FIG. 7B shows an example in which the occlusion is removed in the embodiment of the present invention.

FIG. 7 is a picture showing an example in which the multi-object tracker removes occlusion of objects in the embodiment of the present invention. FIG. 7A shows an example in which occlusion of objects occurs in the embodiment of the present invention, and FIG. 7B shows an example in which the occlusion is removed in the embodiment of the present invention.

When the multi-object tracker removes occlusion of objects, regions (regions inside bounding boxes indicated by a dashed line) which are determined to be occluded by a target object are deleted, as shown in FIG. 7B.

In addition, in operation S360, when a displacement of the bounding box of the target object is detected to be identical to a displacement of the bounding box of another object for a predetermined time period, the multi-object tracker 150 determines that hijacking occurs.

When it is determined in operation S360 that hijacking does not occur (S360—NO), the multi-object tracker 150 outputs an object-tracking image corrected through a removal of occlusion of objects (S370).

When it is determined in operation S360 that hijacking occurs (S360—YES), the multi-object tracker 150 removes the hijacking (S380) and outputs an object-tracking image corrected through a removal of both the occlusion of objects and the hijacking (S390).

FIG. 8 is a table for comparing center location errors of the system for tracking multiple objects according to the embodiment of the present invention and a conventional object tracking system. FIG. 9 is a table for comparing success rates of the system for tracking multiple objects according to the embodiment of the present invention and the conventional object tracking system. FIG. 10 is a table for comparing multi-object tracking times of the system for tracking multiple objects according to the embodiment of the present invention and the conventional object tracking system.

As can be seen from FIG. 8, when the multi-object tracking was performed using the system for tracking multiple objects according to the embodiment of the present invention, the center location error was improved by about 602% on average.

In addition, as can be seen from FIG. 9, when the multi-object tracking was performed using the system for tracking multiple objects according to the embodiment of the present invention, the success rate was improved by about 157%.

Also, as can be seen from FIG. 10, the system for tracking multiple objects according to the embodiment of the present invention processed approximately 3.66 frames per second while the conventional object tracking system processed approximately 0.243 frame per second. Therefore, when the multi-object tracking is performed using the system for tracking multiple objects according to the embodiment of the present invention, the multi-object tracking can be performed about 15 times faster than using the conventional object tracking system.

According to the multi-object tracking technology suggested by the present invention, it is possible to remove occlusion of objects and hijacking which may occur when multiple objects are simultaneously tracked.

In addition, since the multi-object tracking technology proposed by the present invention is based on removing a non-target object causing an error while a target object to be tracked is retained, it is possible to simply and efficiently remove occurrences of occlusion of objects and hijacking.

Further, when the multi-object tracking technology proposed by the present invention is applied, parameter tuning according to a tracking environment can be optimized and an excellent result thereof cane be expected in an actual tracking environment.

Although components or elements of the embodiments of the present invention are described as being combined into one component or element or as being operated in a combined manner, the present invention is not limited to the embodiments. In other words, one or more of the components may be selectively combined to be operated without departing from a scope of the present invention. Further, each of the components may be implemented as a single independent hardware device, but some or all of the components may be selectively combined to be implemented as a computer program which includes a program module that performs some or all of functions combined in one or a plurality of hardware devices. Further, such a computer program may be stored in a computer readable media such as a Universal Series Bus (USB) memory, a compact disk (CD), or a flash memory to be read and executed by a computer to implement the exemplary embodiment of the present invention. Recording media of the computer program may include magnetic recording media, optical recording media, and carrier wave media.

In the meantime, while the system and method for tracking multiple objects according to the present invention have been particularly shown and described with reference to the specific embodiments thereof, it will be understood by those of ordinary skill in the art that the scope of the present invention is not limited to the particular embodiments and various alternatives, changes and modifications may be made therein without departing from the technical idea and scope of the present invention.

Therefore, it would be understood that the embodiments disclosed in the present invention and the attached drawings are not to limit the technical idea of the present invention but to describe the present invention, and the technical and protective scope of the present invention shall not be defined by the illustrated embodiments and the attached drawings. It should be also understood that the protective scope of the present invention is interpreted by the following claims and all technical ideas within the equivalent scope belong to the technical scope of the present invention.

What is claimed is:

1. A system for tracking multiple objects, comprising:
    an image capturing unit configured to capture a video of a predetermined observation area; and
    a multi-object tracker configured to output an object-tracking image by tracking multiple objects within an object image by extracting objects from each of image frames obtained from the captured video,
    wherein the multi-object tracker is further configured to:
    determine that the hijacking occurs, in response to a displacement of a bounding box of a target object, among the multiple objects, being detected to be identical to a displacement of a bounding box of another object, among the multiple objects, for a specified time period, and
    generate a corrected object-tracking image obtained by removing the hijacking from the object-tracking image, in response to the hijacking occurring.

2. The system of claim 1, wherein the multi-object tracker is configured to output the object-tracking image in response to the hijacking not occurring.

3. The system of claim 1, wherein the multi-object tracker is further configured to determine that occlusion of the objects occurs, in response to the bounding box of the target object being detected to be occluded by the bounding box of the other object.

4. The system of claim 1, wherein the multi-object tracker is configured to estimate a bounding box and depth of each of the objects and remove objects except for the target object from the object image, in response to the occlusion of the objects occurring.

5. The system of claim 4, wherein the multi-object tracker is further configured to:
    determine a depth order of the objects on the basis of the estimated bounding boxes and depths of the objects,
    recognize at least one of objects in front of and behind the target object on the basis of the determined depth order of the objects, and
    remove the recognized object.

6. The system of claim 1, wherein, the multi-object tracker is configured to remove an object being actually tracked by the bounding box of the target object from the object image so that the bounding box of the target object tracks the target object, in response to the hijacking occurring.

7. The system of claim 1, wherein the multi-object tracker is further configured to:
    generate a reference background image by modeling a reference background using a reference background modeling video obtained from the image capturing unit, and
    generate the object image by extracting the objects from each of the image frames on the basis of comparison between the reference background image and each of the image frames obtained from a video for object tracking obtained from the image capturing unit.

8. The system of claim 7, wherein the multi-object tracker is further configured to:
    obtain a color difference by comparing colors of the reference background image and each of the image frames, and
    extract the objects from each of the image frames on the basis of the obtained color difference.

9. The system of claim 1, wherein, in response to the generated object image being an initial object image, the multi-object tracker is configured to:
    allocate a bounding box to each of the objects to initialize the tracking of the multiple objects, in response to the object image being an initial object image.

10. A method of tracking multiple objects, the method comprising:
    generating a reference background image by modeling a reference background using a reference background modeling video obtained from an image capturing unit;
    generating an object image by extracting objects from each of image frames on the basis of comparison between the reference background image and each of the image frames obtained from a video for object tracking obtained from the image capturing unit;
    determining whether the hijacking occurs on the basis of detection of whether a displacement of a bounding box of a target object, among the multiple objects, is identical to a displacement of a bounding box of another object, among the multiple objects; and
    outputting a corrected object-tracking image according to a result of determination of the hijacking occurs, while performing a multi-object tracking on the basis of the object image,
    wherein the corrected object-tracking image is generated by removing the occurring hijacking from the current object-tracking image.

11. The method of claim 10, further comprising:
determining whether occlusion of the objects occurs on the basis of detection of whether a bounding box of a target object is occluded by a bounding box of another object.

12. The method of claim 10, further comprising outputting the object-tracking image in response to determining that the hijacking does not occur.

13. The method of claim 10, wherein the object-tracking image is corrected by removing objects except for the target object from the object image by estimating a bounding box and depth of each of the objects.

14. The method of claim 10, wherein the object-tracking image is corrected by removing an object being actually tracked by the bounding box of the target object from the object image so that the bounding box of the target object tracks the target object.

15. The method of claim 10, wherein the object-tracking image is corrected by removing objects except for the target object from the object image by estimating the bounding box and depth of each of the objects and is corrected also by removing an object being actually tracked by the bounding box of the target object from the object image so that the bounding box of the target object tracks the target object.

16. The method of claim 13, wherein the removing of the objects except for the target object from the object image by estimating the bounding box and depth of each of the objects comprises:
determining a depth order of the objects on the basis of the estimated bounding boxes and depths of the objects,
recognizing at least one of objects in front of and behind the target object on the basis of the determined depth order, and
removing the recognized object.

17. The method of claim 10, wherein the generating of the object image comprises:
obtaining a color difference by comparing colors of the reference background image and each of the image frames, and
extracting the objects from each of the image frames on the basis of the obtained color difference.

18. The method of claim 10, wherein, when an initial multi-object tracking is performed, the performing of the multi-object tracking on the basis of the object image includes allocating a bounding box to each of the objects to initialize the tracking of the multiple objects.

\* \* \* \* \*